Figure 1:
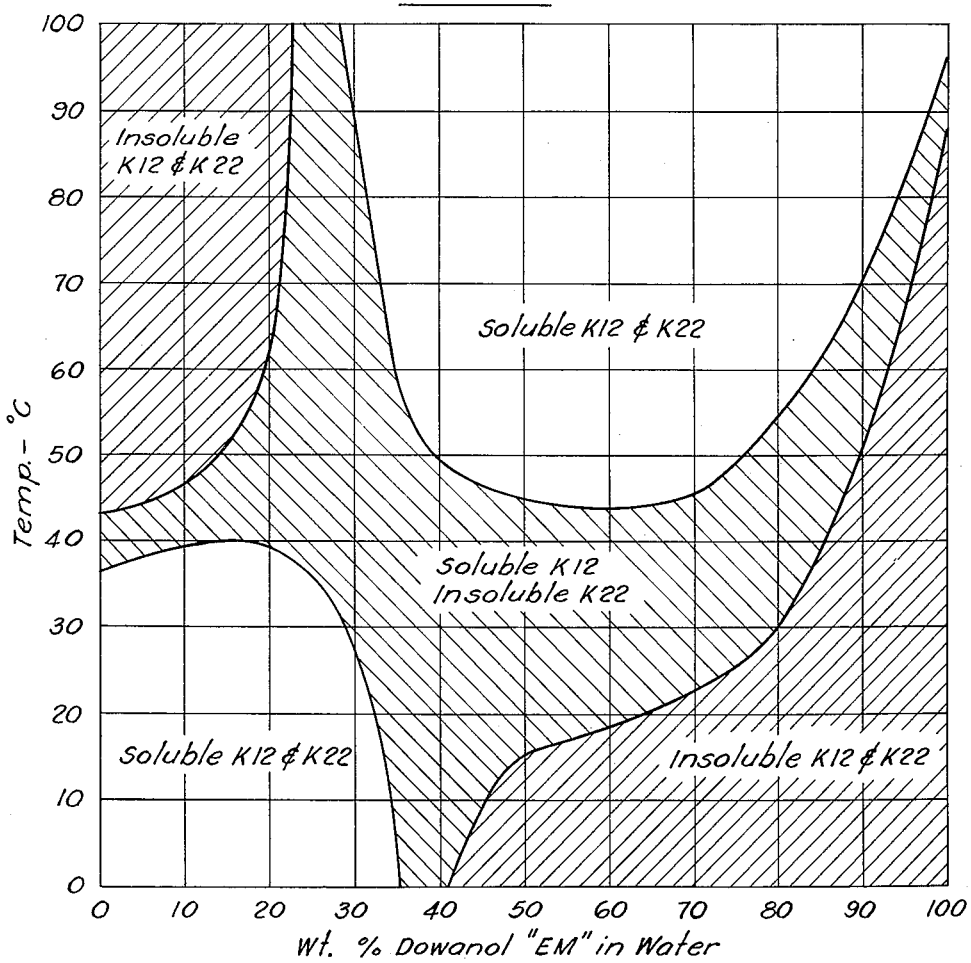

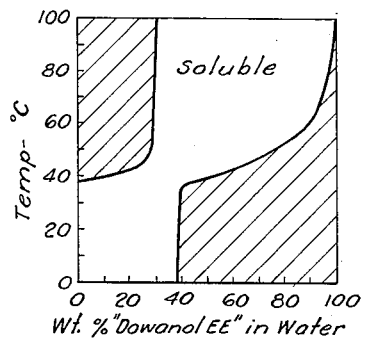
Fig. 3 — Solubility of K-29 and K-42 PV-M in Mixtures of "Dowanol EE" and Water
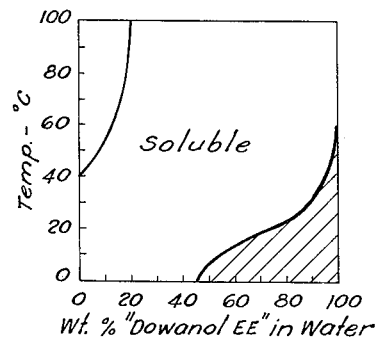
Fig. 4 — Solubility of K-12 and K-16 PVO-M in Mixtures of "Dowanol EE" and Water
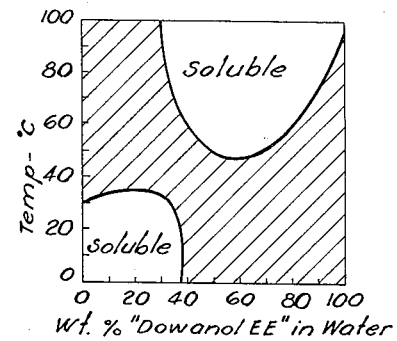
Fig. 5 — Solubility of K-22 PVO-M in Mixtures of "Dowanol EE" and Water
INVENTORS.
Wilhelm E. Walles
William F. Tousignant
BY Jerome Rudy
ATTORNEY

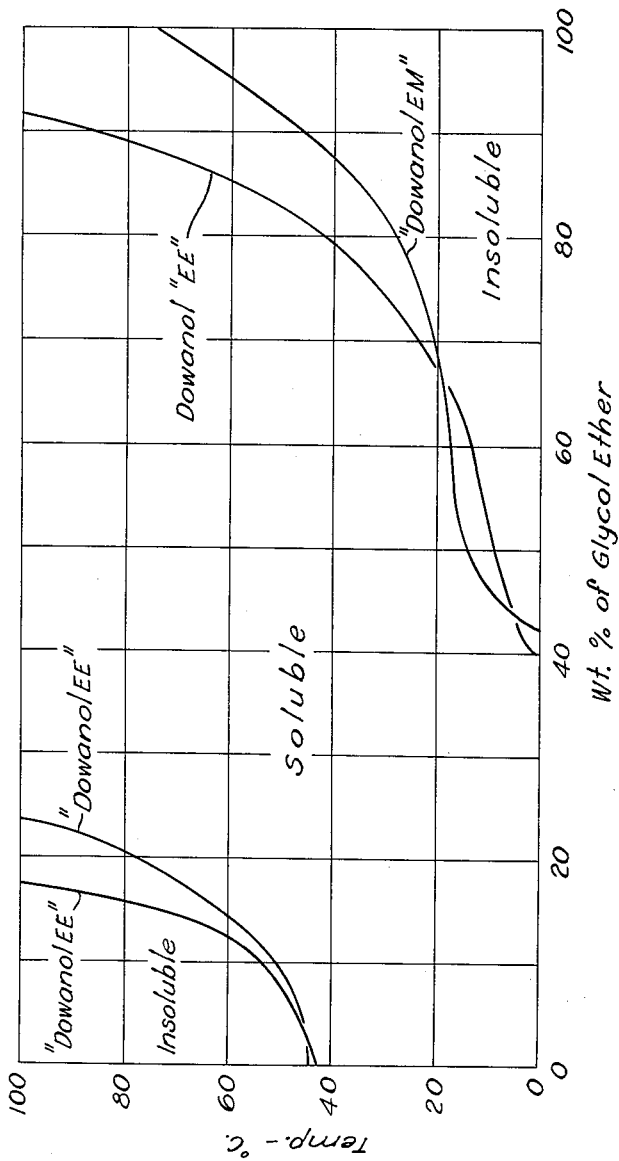

United States Patent Office

3,054,764
Patented Sept. 18, 1962

3,054,764
APPLICATING SOLUTIONS OF POLY-N-VINYL-5-METHYL - 2 - OXAZOLIDINONE IN AQUEOUS GLYCOL ETHER SOLVENTS
Wilhelm E. Walles, and William F. Tousignant, Midland, Mich., assignors to The Dow Chemical Company, Midland, Mich., a corporation of Delaware
Filed Mar. 10, 1958, Ser. No. 720,355
5 Claims. (Cl. 260—29.6)

The present invention relates to new and useful aqueous solutions of poly-N-vinyl-5-methyl-2-oxazolidinone (hereinafter referred to as PVO-M), which solutions are substantially, if not entirely, free of "cloud point" effects and which comprise advantageous admixtures of various glycol ethers with water in the solvent media.

PVO-M is a water-soluble polymer of recent origin having many exceptionally beneficial and remarkable characteristics and properties. By way of illustration, PVO-M has unusual capacity for and the pronounced capability of attracting and accepting many of a wide variety of dyestuffs, including vat, acid, acetate, direct, naphthol and sulfur dyes. This property makes the polymer significantly attractive as a dye-assisting adjuvant for many synthetic textile fibers that are normally difficult, if not impossible, to dye and in which the PVO-M may be incorporated. It may also be utilized with benefit as a dye-stripping agent for removing dyestuffs from various colored textile goods and materials.

This polymer has been disclosed in the copending application for United States Letters Patent having Serial No. 696,317, filed November 14, 1957, by Wilhelm E. Walles, William F. Tousignant and Thomas Houtman, Jr., for "N-Vinyl-X-Alkyl-2-Oxazolidinone Compounds." This application is now issued as U.S. Patent No. 2,919,279.

While PVO-M is a water-soluble resinous material, its solubility in aqueous media is not general or entirely unrestricted. Thus, although PVO-M in broad molecular weight ranges up to about 100,000 to 200,000 or so is quite soluble in water at normal room temperatures, the polymer is afflicted with the phenomenon of inverse solubility in water with increasing temperature. If a clear solution of PVO-M in water is heated, it becomes cloudy at temperatures in the neighborhood of 40° C., depending upon the particular molecular weight range of the polymer under observation. Accordingly, the cloud point in aqueous solution of PVO-M having a Fikentscher K-value greater than about 30 is usually about 35° C. Lower K-value polymers, such as those with K-values of say, 12 or 16, have cloud points in water of about 43° C. or so. At temperatures that are about 10 centigrade degrees higher than the cloud point of the PVO-M in aqueous solution, the polymer generally separates from the solvent vehicle in the form of a sticky, frequently difficult-to-handle mass.

For many applications, the indicated characteristics are not of material consequence. In certain instances, however, they may be of decided disadvantage. Thus, one of the attractive utilities of PVO-M is as a dye-receptor for acrylonitrile polymer compositions. One highly advantageous technique for providing such compositions, particularly when polyacrylonitrile based fiber products are involved, is to apply or impregnate the PVO-M from an aqueous solution of relatively low polymer solids content to a shaped acrylonitrile polymer article that is in an aquagel condition. Thus, an acrylonitrile polymer filamentary article that, pursuant to a well known procedure, has been salt spun in a wet spinning operation from an aqueous saline spinning solution may be conveniently passed, after its coagulation and while it is still in an aquagel or highly hydrated condition, through an aqueous bath containing the dissolved PVO-M in order to impregnate the filament with the dye-assisting polymer adjuvant. It is sometimes desirable in such an operation to employ a heated impregnating bath. However, as is evident, such conditions may cause precipitation of the polymer due to its inverse solubility characteristics above about 40° C. or so. This may tend to complicate the impregnation operation.

Likewise, in dye stripping processes, better results are oftentimes achieved when the textile product (such as a cloth, fabric, or other textile goods) is treated in and by means of a hot or boiling aqueous bath in order to achieve the desired end.

It would be an advantage, and it is the chief aim and concern of the present invention, to provide applicating or treating solutions of PVO-M having a greater and more extended range of solubility, even under conditions of considerably high temperature, and which are not hampered for use by undesired cloud point characteristics. The inherent benefit of such aqueous solutions of the polymer for use in various treatments of textiles as well as for other applications is manifest from the foregoing description and is further evident in the ensuing description and specification.

In accordance with the present invention, highly advantageous applicating and treating solutions of PVO-M are comprised essentially of an aqueous solution of the polymer wherein the solvent media consists of water that is mixed with such a quantity of a normally water-soluble or miscible glycol ether as will raise the cloud point of the polymer substantially above its cloud point in pure water, and preferably will completely eliminate such phenomenon.

The effective proportions of the water and glycol ether for constituting the solvent media of the present compositions varies in a more or less unpredictable manner with the particular glycol ether involved and, oftentimes more noticeably, with the K-value of the PVO-M in solution. The effect of polymer concentration is generally not too noticeable, although some differences are involved with different concentrations of polymer in the mixed solvent. Ordinarily, the aqueous mixtures of the present invention, when the admixed constituents of the solvent vehicle have been properly proportioned, are capable of dissolving up to at least about 20 percent by weight of the polymer, and frequently up to as much as 50 or more weight percent of the polymeric solute, based on the weight of the resulting solution. In any event, the precise proportioning of the glycol ether/water solvent vehicle is a matter of simple and straightforward test for the investigator and not much more difficult than the taking of temperature readings or the observation of other data. To illustrate, a mixture of the glycol ether in water can be prepared and tested for its cloud point characteristics as a solvent for PVO-M by merely dissolving the polymer in the prepared solvent and observing at what temperature, if any, a cloud point is noticed. From such elementary manipulations, one can readily judge, in any given situation (taking into account the desired temperature at which the resulting solution is intended to be employed), whether the solvent mixture requires adjustment by addition of one or the other constituent thereto.

The glycol ethers that are employed in the practice of the present invention are water-soluble materials that, in general, boil above about 100° C. As is well known, such products are obtained by reaction of a lower alkylene oxide with a mono or multifunctional alcohol. Typical of the glycol ethers that may be utilized with benefit are ethylene glycol methyl ether ($CH_3$—O—$C_2H_4$—OH); ethylene glycol ethyl ether ($C_2H_5$—O—$C_2H_4$—OH); ethylene glycol n-butyl ether ($C_4H_9$—O—$C_2H_4$—OH); diethylene glycol methyl ether $$(CH_3—O—C_2H_4—O—C_2H_4—OH)$$

diethylene glycol ethyl ether $$(C_2H_5—O—C_2H_4—O—C_2H_4—OH)$$

diethylene glycol n-butyl ether $$(C_4H_9—O—C_2H_4—O—C_2H_4—OH)$$

propylene glycol methyl ether $$(CH_3—O—CH_2—CHOH—CH_3)$$

dipropylene glycol methyl ether $$(CH_3—O—C_3H_6—O—C_3H_6—OH)$$

tripropylene glycol methyl ether $$(CH_3—O—C_3H_6—O—C_3H_6—O—C_3H_6—OH)$$

and their close homologues and equivalents. Many of the properties and characteristics of these and other glycol materials are available in a publication entitled "'Dowanol'—Glycol Ether Solvents" (1957 ed., The Dow Chemical Company, Midland, Michigan).

Advantageously, ethylene glycol methyl ether or ethylene glycol ethyl ether or mixtures thereof are utilized in the preparation of the aqueous solvent medium for the PVO-M for practice of the present invention. The former material is commercially available under the trade designation "Dowanol EM" (formerly known as "Dowanol 7"), while the latter is available as "Dowanol EE" (formerly known as "Dowanol 8").

The improvement in the cloud point of the aqueous polymer solutions of the present invention is particularly surprising when account is taken of the fact that PVO-M is generally insoluble in water at temperatures much above about 40° C. while being usually insoluble in many of the glycol ethers at even much higher temperatures. Thus, in ethylene glycol methyl ether, PVO-M is not soluble to any appreciable extent beneath temperatures of about 90° C.

When employing mixtures of water and ethylene glycol methyl ether as the solvent media, it is generally advantageous for the aqueous vehicle to contain from about 25 to 80 weight percent, based on the weight of the solvent, of the glycol ether in order to dissolve a polymer having a K-value in the neighborhood of 12. For polymers with K-values of about 22, greater benefit is derived when the solvent mixture contains from about 40 to 75 percent by weight of the glycol ether. Similar results and analogous specific ranges are obtained when different K-value polymers are involved and when different glycol ethers are utilized in the practice of the invention. Thus, when aqueous ethylene glycol ethyl ether is employed as the solvent medium it is generally beneficial for the solvent mixture to contain from about 20 to about 90 weight percent of the glycol ether in the water admixture.

Basis for the foregoing conclusions is more clearly evident in the following, taken in connection with the graphs in the several figures of the accompanying drawing which illustrate ternary phase diagrams for several PVO-M/glycol ether/water systems.

By way of further illustration, a series of ethylene glycol methyl ether/water solvents containing varied proportions of the constituents were prepared and utilized to determine their solvent effect and influence on cloud point of different samples of PVO-M having K-values of 22 and 12, respectively. In all of the solutions tested, the amount of polymer employed was 3.3 percent by weight, based on the entire weight of the composition. The results are set forth in the following tabulation and the data therein contained reproduced graphically in FIGURE 1 of the accompanying drawing.

TABLE

*Ternary Phase Diagrams*

PVO-M/"DOWANOL EM"/WATER SYSTEMS USING K-22 AND K-12 POLYMER

| Percent by Weight of "Dowanol EM" In Aqueous Solvent Medium | K-22 | | K-12 | |
|---|---|---|---|---|
| | Cloud Point 1, °C. | Cloud Point 2, °C. | Cloud Point 1, °C. | Cloud Point 2, °C. |
| 0 | 36.5 | | 43 | |
| 5 | 38 | | | |
| 10 | 39.5 | | 46.5 | |
| 15 | 40 | | | |
| 20 | 39.5 | | 60.5 | |
| 22½ | | | 84 | |
| 25 | 36 | (¹) | (²) | |
| 30 | 29 | 90.5 | | |
| 35 | 2 | 59.5 | | (³) |
| 40 | (⁴) | 49.5 | | (²) |
| 45 | | 47 | | 9.5 |
| 50 | | 45 | | 15.5 |
| 52 | | | | 16 |
| 54 | | | | 16.5 |
| 55 | | | | 17 |
| 70 | | 45.5 | | 23 |
| 80 | | | | 30 |
| 90 | | | | 51 |
| 100 | | 96 | | 88 |

¹ All cloudy up to 100.
² All clear.
³ Clear 0–100.
⁴ All cloudy.

Figure 2:
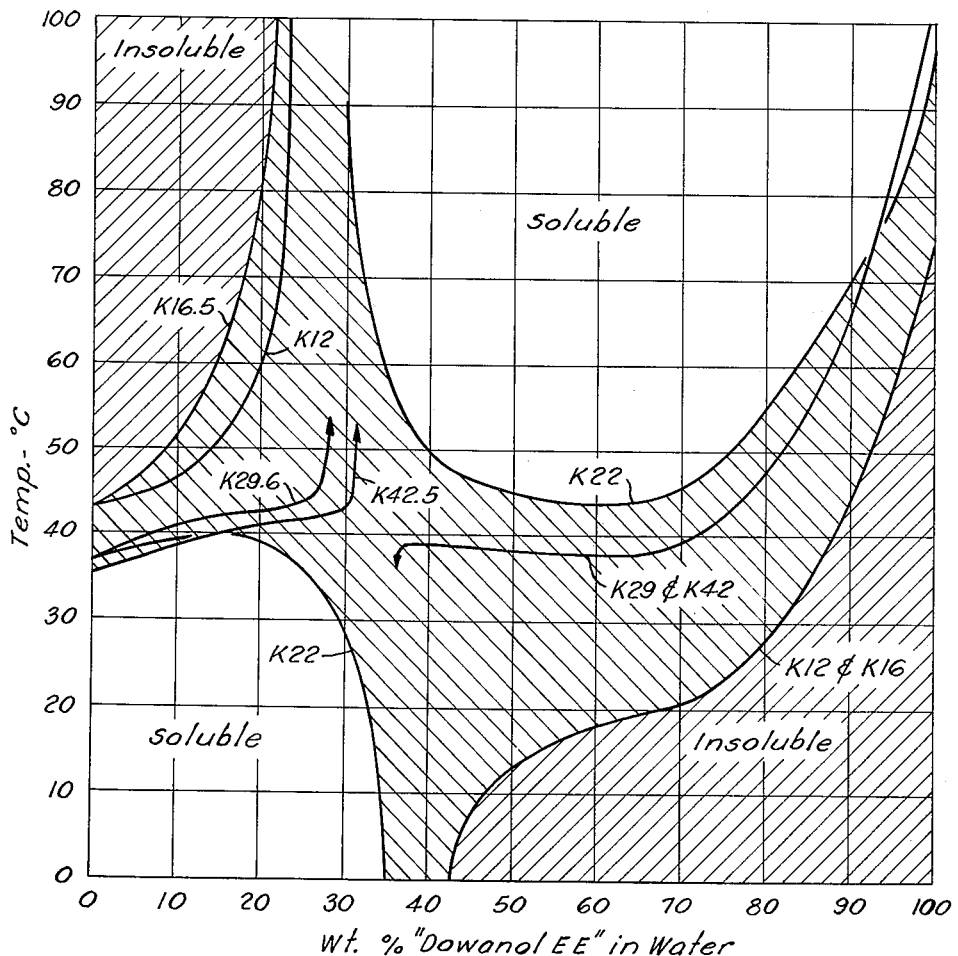

The foregoing general procedure was repeated excepting to utilize ethylene glycol ethyl ether as the glycol ether in the solvent mixture with water and to employ PVO-M of K-values 12, 16, 22, 29 and 42.5. The results obtained are set forth in the ternary phase diagram that is graphically portrayed in FIGURE 2 of the accompanying drawing. In FIGURES 3, 4 and 5 the representative behavior of the several polymer species illustrated in FIGURE 2 are respectively particularized to afford clarification of FIGURE 2.

In FIGURE 6 of the accompanying drawing there is set forth and compared the differences in effect of employing either ethylene glycol methyl ether or ethylene glycol ethyl ether as the glycol constituent of the mixed aqueous solvent.

In order to further illustrate the invention, a spinning solution comprised of about 10 parts of polyacrylonitrile dissolved in about 90 parts of a 60 percent aqueous solution of zinc chloride is salt spun by being extruded through a spinnerette having 750 orifices, each having a diameter of about 6 mils into an aqueous coagulating bath that contains about 42 percent by weight of zinc chloride dissolved therein to be spun into a multiple filament aquagel tow. The coagulated tow is washed substantially free from salt after being withdrawn from the coagulating bath and collected. There is thereby obtained an aquagel fiber containing about 2 parts of water for each part of polymer therein. About 1.5 grams (on a wet weight basis) of the aquagel fiber is immersed for about 20 minutes in an aqueous solution of PVO-M containing about 2.5 percent by weight of dissolved polymer in which the solvent consists of an equal weight mixture of ethylene glycol methyl ether and water. The applicating solution is maintained at about 90° C. during the impregnation. The PVO-M employed has a Fikentscher K-value of about 20.2. After being impregnated for about 5 minutes, the polyacrylonitrile fiber is removed from the impregnating bath and dried at a temperature of about 150° C. for 15 minutes. The impregnated sample is found to be readily dyeable to deep and level shades of coloration when dyed in a conventional manner with 0.3 percent Sevron Brilliant Red 4G, a basic dyestuff, formerly known as Basic Red 4G (Colour Index Basic Red 14); 4 percent Calcodur Pink 2BL (formerly Colour Index 353 and, more recently, Colour Index Direct Red 75) or with many other of a wide variety of dyestuffs. In contrast, when the same impregnating procedure is attempted with pure water solutions of the PVO-M, temperatures greater than about 40° C. cannot be employed without incurring undesirable clouding and precipitating effects due to the inverse solubility of the polymer in water.

Certain changes and modifications in the practice of the present invention can be readily entered into without departing from its intended spirit and scope. Therefore, it is to be fully understood that the invention is not to be considered as being limited or in any way restricted to or by the preferred deictic embodiments thereof which are included in the foregoing description and specification. Rather, it is to be interpreted and construed in the light of what is set forth and defined in the hereto appended claims, taking into account the fact that poly-N-vinyl-4-methyl-2-oxazolidinone is generally equivalent to poly-N-vinyl-5-methyl-2-oxazolidinone and that identical results are obtained when the latter isomer is entirely or only partially replaced with the former and that both species, for present purposes, are adapted for utilization in the practice of the present invention and intended to be covered thereby.

What is claimed is:

1. An aqueous solution of poly-N-vinyl-5-methyl-2-oxazolidinone which consists essentially of said polymer dissolved in a solvent vehicle consisting essentially of water mixed with a glycol ether that is soluble in water and boils above about 100° C., said glycol ether being present in said aqueous solvent vehicle in an amount such that the cloud point of the polymer in the resulting solution is increased in comparison with the cloud point of the same polymer at the same concentration in water.

2. The solution of claim 1 wherein said glycol ether is selected from the group consisting of ethylene glycol methyl ether; ethylene glycol ethyl ether; ethylene glycol n-butyl ether; diethylene glycol methyl ether; diethylene glycol ethyl ether; diethylene glycol n-butyl ether; propylene glycol methyl ether; dipropylene glycol methyl ether; and tripropylene glycol methyl ether.

3. The solution of claim 1 wherein said polymer has a K-value less than about 20 and said glycol ether is ethylene glycol methyl ether which is present in said solvent in an amount between about 25 and 80 percent by weight, based on the weight of the solvent vehicle.

4. The solution of claim 1 wherein said polymer has a K-value greater than about 20 and said glycol ether is ethylene glycol methyl ether which is present in said mixed solvent in an amount between about 40 and 75 percent by weight, based on the weight of the aqueous solvent.

5. The solution of claim 1 wherein said glycol ether is ethylene glycol ethyl ether which is present in said solvent in an amount between about 20 and 90 percent by weight, based on the weight of the solvent vehicle.

References Cited in the file of this patent

UNITED STATES PATENTS

| | | |
|---|---|---|
| 2,435,950 | Neher | Feb. 10, 1948 |
| 2,471,497 | Roberts et al. | May 31, 1949 |
| 2,786,043 | Schuller et al. | Mar. 19, 1957 |
| 2,818,362 | Drechsel | Dec. 31, 1957 |
| 2,919,279 | Walles et al. | Dec. 29, 1959 |